Feb. 17, 1942.  J. M. NICKELSEN  2,273,415
ROD ASSEMBLY
Filed June 24, 1940
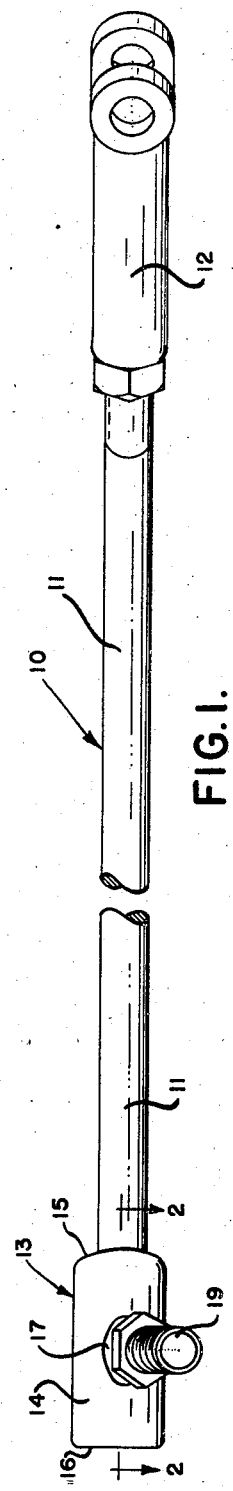
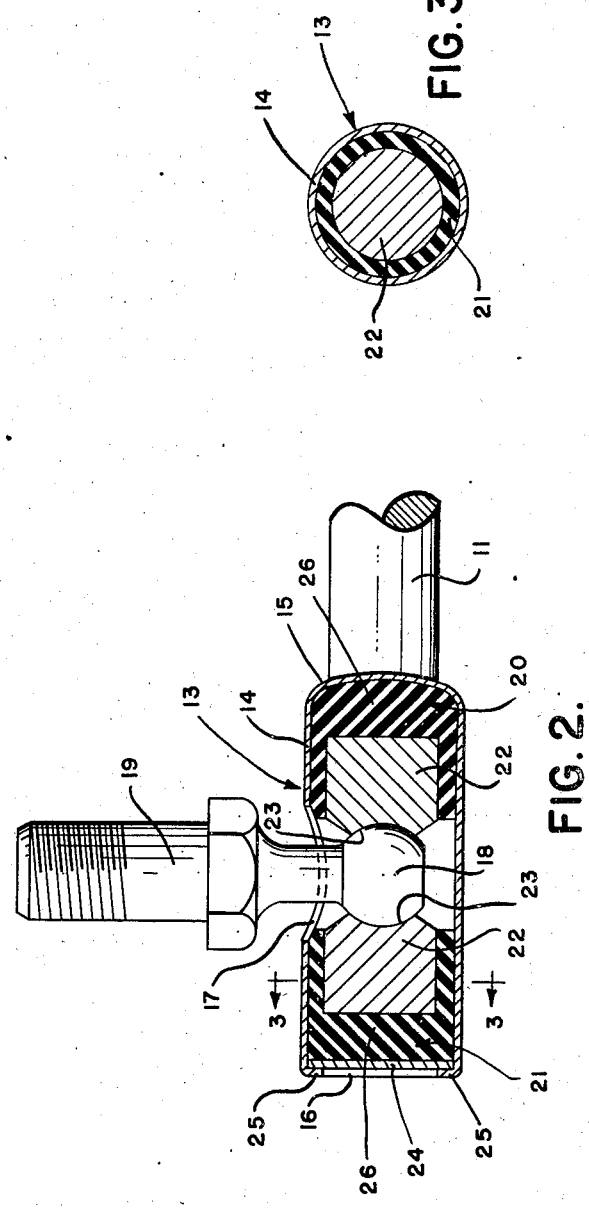
INVENTOR.
JOHN M. NICKELSEN
BY Whittemore Hulbert & Belknap
ATTORNEYS

UNITED STATES PATENT OFFICE 2,273,415

ROD ASSEMBLY

John M. Nickelsen, Ann Arbor, Mich., assignor to Monroe Auto Equipment Company, Monroe, Mich., a corporation of Michigan Application June 24, 1940, Serial No. 342,154

3 Claims. (Cl. 287—90)

This invention relates generally to connecting rod assemblies and refers more particularly to improvements in the means provided at the end of the rod for connecting the latter to an adjacent member.

One of the principal objects of this invention consists in the provision of a relatively simple inexpensive coupling unit on the rod having a connecting part angularly movable relative to the rod and having provision for maintaining an effective bearing engagement for the connecting part regardless of any wear that may take place over a long period of use.

Another advantageous feature of this invention consists in the provision of a coupling unit of the type set forth above which is quiet in operation and prevents the transmission of noise from the connecting part to the rod.

The foregoing, as well as other objects, will be made more apparent as this description proceeds, especially when considered in connection with the accompanying drawing, wherein:

Figure 1 designates a typical connecting rod having a coupling unit constructed in accordance with this invention;

Figure 2 is an enlarged sectional view taken substantially on the plane indicated by the line 2—2 of Figure 1;

Figure 3 is a cross sectional view taken substantially on the plane indicated by the line 3—3 of Figure 1.

In Figure 1 of the drawing, I have illustrated a rod assembly 10 comprising a rod 11 having a clevis 12 suitably attached to one end thereof and having a coupling unit 13 secured to the opposite end. In the present instance, the rod is shown as being of solid construction, although it will be apparent as this description proceeds that the invention concerns itself more particularly with the construction of the coupling unit 13 which may be advantageously employed in practically any installation where it is desired to effect a connection between two relatively movable parts.

The coupling unit 13 is provided with a sheet metal housing 14 having one end 15 closed and having the opposite end 16 open. In the present instance, the closed end 15 of the housing is welded or otherwise permanently secured to the free end of the rod 11 so as to form a unit with the latter. As shown particularly in Figure 2, the housing 14 is further provided with an opening 17 through one side wall thereof intermediate the ends of the same and this opening is of sufficient size to permit extending the head 18 of a suitable stud 19 into the housing. The head 18 of the stud is spherical in shape and the stem of the stud is preferably threaded to permit attachment to an adjacent part (not shown).

Located within the housing 14 on opposite sides of the spherically-shaped head 18 is a pair of cup-shaped retainers 20 and 21 preferably formed of resilient material, such as rubber or synthetic rubber. It will be observed from Figure 2 that the retainers are positioned in the housing in such a manner that the recesses open toward the head 18 on the stud and each retainer is adapted to receive a bearing element 22 formed of a suitable metallic bearing material.

It follows from the above that a pair of bearing elements 22 is supported by the retainers in the housing on opposite sides of the head 18 on the stud. The adjacent ends of the bearing elements are fashioned with spherically-shaped recesses 23 corresponding in curvature to the adjacent surfaces of the head 18 on the stud. The arrangement is such that the adjacent ends of the bearing elements cooperate with one another to form a socket or bearing for the head 18 and permit universal angular movement of the stud relative to the housing. In this connection, attention is further called to the fact that the opening 17 through the side wall of the housing is of sufficient dimension to permit a substantial degree of swinging movement of the stud in any one of several directions relative to the housing.

The open end 16 of the housing is closed by means of a disc 24 insertable into the open end 16 and secured in place by crimping the free edge portions 25 of the housing over the periphery of the disc. In actual practice, sufficient pressure is placed on the disc 24 to secure the retainers in the housing under compression so that after the parts have been assembled, the bearing elements 22 are yieldably urged by the retainers into frictional engagement with the head 18 of the stud. In this connection, attention is called to the fact that the base portions 26 of the cup-shaped retainers are considerably thicker than the side walls thereof. As a result, the resiliency of the coupling is increased without correspondingly increasing the diameter of the housing and any wear between the head 18 and bearing surfaces 23 on the members 22 is automatically taken up or compensated for. It is also important to note that the bearing members 22 are thoroughly insulated from metallic contact with the housing 14 and this is desirable in that it not only provides a quiet operating joint, but prevents the transmission of any noise through the joint.

In assembly, one of the bearing elements 22 is inserted in the cup-shaped retainer 20 so that the spherical bearing surface 23 faces the open end of the retainer and the latter is then sleeved within the housing 14 through the open end 16 of the housing. After the retainer 20 is positioned with the base thereof in abutting engagement with the inner surface of the end wall 15 of the housing, the stud 19 is assembled with the housing by moving the head portion 18 through the opening 17 into engagement with the spherical recess or bearing surface 23 of the adjacent bearing element 22. The other bearing element 22 is then assembled with the cup-shaped retainer 21 and the latter is sleeved into the housing 14 through the open end 16 to engage the bearing surface 23 on the latter bearing element 22 with the head 18 of the stud. The disc 24 is then inserted into the open end of the housing under pressure and the marginal portions 25 of the housing are crimped over the periphery of the disc in the manner shown in Figure 2.

What I claim as my invention is:

1. A rod assembly comprising, a member having a housing provided with an opening through one side wall, a connecting member extending into the housing through said opening and having a spherically-shaped head portion of less diameter than the opening in the side wall of the housing to enable the head to be inserted into said housing through said opening, cylindrical metal bearing blocks positioned in the housing at opposite sides of the head and having spherically-shaped recesses in adjacent ends cooperating with each other to provide a bearing engaging said head, a cup-shaped retainer for each bearing block formed of a resilient material, and means for securing the retainers in said housing under compression whereby the said retainers cooperate with one another to urge the bearing blocks into frictional engagement with the head of said connecting member.

2. A rod assembly comprising, a rod, a one piece elongated housing having one end closed and secured to one end of the rod and having the opposite end open, a stud extending into the housing through an opening in the side wall of the housing and having a spherically-shaped head of less diameter than the opening in the side wall of the housing to enable the head to be inserted into the housing through the opening in the side wall of the housing, a pair of cup-shaped retainers of resilient material positioned in the housing on opposite sides of the stud head with the open ends facing each other and having annular side walls extending in the direction of the axis of the housing, a metal bearing element fitted in each retainer and having the side walls surrounded by the annular side walls of the retainers and having spherically-shaped recesses in adjacent ends cooperating to form a bearing for the stud head, and a closure for the open end of said housing operable to secure the retainers under compression in the housing.

3. A rod assembly comprising, a rod, an elongated one piece tubular housing having one end closed and secured to one end of the rod and having the opposite end open, a connecting member extending into the housing through an opening in the side wall of the housing intermediate the ends of the latter and having a spherically shaped head located in the housing, said head being of less diameter than the opening in the side wall of the housing to enable the head to be inserted into the housing through the latter opening, a pair of cup-shaped retainers of resilient material located in the housing on opposite sides of said head with the open ends facing each other and having an external diameter so determined with respect to the internal diameter of the housing to enable the retainers to be telescoped into the housing through the open end of the latter, said cup-shaped retainers having annular side walls extending in the direction of the axis of the housing and having base portions of substantially greater thickness than the annular side walls, a metal bearing element located in each retainer and surrounded by the annular side walls of the retainers and having the adjacent ends shaped to cooperate with one another to form a bearing for the head on said connecting member, and a closure for the open end of the housing engageable with the relatively thick base portion of the adjacent retainer in a manner to secure both retainers under compression in the housing.

JOHN M. NICKELSEN.